(12) United States Patent
Harris et al.

(10) Patent No.: US 11,068,132 B2
(45) Date of Patent: *Jul. 20, 2021

(54) COMMAND USER INTERFACE FOR DISPLAYING SELECTABLE SOFTWARE FUNCTIONALITY CONTROLS

(71) Applicant: Microsoft Technology Licensing, LLC, Redmond, WA (US)

(72) Inventors: Jensen M. Harris, Seattle, WA (US); Aaron M. Butcher, Duvall, WA (US); David A. Morton, Redmond, WA (US); Jesse Clay Satterfield, Seattle, WA (US); Justin Denney, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/545,836

(22) Filed: Aug. 20, 2019

(65) Prior Publication Data

US 2020/0081594 A1 Mar. 12, 2020

Related U.S. Application Data

(63) Continuation of application No. 14/981,404, filed on Dec. 28, 2015, now Pat. No. 10,437,431, which is a (Continued)

(51) Int. Cl.
G06F 3/048 (2013.01)
G06F 3/0483 (2013.01)
(Continued)

(52) U.S. Cl.
CPC .......... *G06F 3/0483* (2013.01); *G06F 3/0481* (2013.01); *G06F 3/04812* (2013.01); *G06F 3/04842* (2013.01); *H04N 21/47* (2013.01)

(58) Field of Classification Search
CPC ............. H04N 21/482; H04N 5/44543; H04N 1/00132; H04N 1/00416; H04N 1/0044;
(Continued)

(56) References Cited

U.S. PATENT DOCUMENTS 5,598,557 A 1/1997 Doner et al.
5,999,730 A 12/1999 Lewis
(Continued)

OTHER PUBLICATIONS

Microsoft Office Word 2003; Microsoft Corporation; Copyright 1983-2003; 12 pages.*
(Continued)

*Primary Examiner* — Linh K Pham
(74) *Attorney, Agent, or Firm* — NovoTechIP International PLLC (57) ABSTRACT

An improved user interface is provided for displaying selectable software functionality controls and for presenting logical groupings of particular functionality controls associated with a selected top-level functionality. Underneath a row of top-level functionality tabs, functionalities controls associated with a given top-level functionality tab are presented in logical groupings. Selection of a particular tab switches modes of the user interface to present controls for functionalities associated with the selected tab.

14 Claims, 8 Drawing Sheets

Related U.S. Application Data continuation of application No. 13/595,084, filed on Aug. 27, 2012, now Pat. No. 9,223,477, which is a continuation of application No. 10/955,967, filed on Sep. 30, 2004, now Pat. No. 8,255,828.

(60) Provisional application No. 60/601,815, filed on Aug. 16, 2004.

(51) Int. Cl.
*G06F 3/0481* (2013.01)
*G06F 3/0484* (2013.01)
*H04N 21/47* (2011.01)

(58) Field of Classification Search
CPC .......... H04N 1/00167; H04N 1/00427; H04N 5/262; H04N 5/765; H04N 1/00196; G06F 3/0481; G06F 3/0482
See application file for complete search history.

(56) References Cited

U.S. PATENT DOCUMENTS

| | | | |
|---|---|---|---|
| 6,493,006 B1* | 12/2002 | Gourdol | G06F 3/0482 715/810 |
| 7,207,953 B1* | 4/2007 | Goicaj | A61H 23/02 601/134 |
| 7,516,186 B1 | 4/2009 | Borghetti et al. | |
| 7,595,722 B2* | 9/2009 | Heimermann | B60K 35/00 340/461 |
| 7,624,339 B1* | 11/2009 | Engel | G06F 3/1423 715/212 |
| 10,248,687 B2 | 4/2019 | Hartwell et al. | |
| 2002/0099777 A1 | 7/2002 | Gupta et al. | |
| 2002/0184611 A1 | 12/2002 | Endejan | |
| 2003/0035012 A1* | 2/2003 | Kurtenbach | G06F 3/0482 715/810 |
| 2003/0048302 A1 | 3/2003 | Quan | |
| 2003/0090528 A1* | 5/2003 | Masuda | G06T 11/60 715/838 |
| 2004/0027473 A1* | 2/2004 | Suzuki | H04N 5/232 348/333.02 |
| 2004/0268259 A1 | 12/2004 | Rockey et al. | |
| 2006/0053380 A1 | 3/2006 | Spataro et al. | |
| 2015/0363049 A1 | 12/2015 | Sadouski et al. | |
| 2019/0197037 A1 | 6/2019 | Hartwell et al. | |
| 2020/0285356 A1 | 9/2020 | Satterfield et al. | |

OTHER PUBLICATIONS

"Description of Digital Signatures And Code Signing in Word 2002 and in Later Versions of Word", Retrieved from: http://web.archive.org/web/20190907090343/https://support.microsoft.com/en-us/help/920627/description-of-digital-signatures-and-code-signing-in-word-2002-and-in, Sep. 7, 2019, 7 Pages.

"Summons to Attend Oral Proceedings in European Patent Application No. 09770706.1", Mailed Date: Nov. 29, 2019, 7 Pages.

"Office Action Issued In Brazil Patent Application No. PI 0913024-1", dated Nov. 21, 2019, 5 Pages.

"Office Action Issued in Brazilian Patent Application No. PI0914946-5", dated Oct. 30, 2019, 4 Pages.

"Getting Results with Microsoft Office 97", Published by Microsoft, 1997, 8 Pages.

"Notice of Allowance Issued In U.S. Appl. No. 15/476,220", dated Aug. 15, 2019, 10 Pages.

"Non Final Office Action Issued in U.S. Appl. No. 15/483,901", dated Jul. 10, 2019, 14 Pages.

"Final Office Action Issued in U.S. Appl. No. 15/605,004", dated Aug. 29, 2019, 17 Pages.

"Office Action Issued in Brazilian Patent Application No. PI0913024-1", dated Jul. 7, 2019, 5 Pages.

"Office Action Issued in Brazilian Patent Application No. PI0914946-5", dated Jun. 13, 2019, 5 Pages.

"Office Action Issued in Brazilian Patent Application No. PI10072640", dated Sep. 1, 2019, 5 Pages.

"Office Action Issued in Brazilian Patent Application No. PI10133348", dated Aug. 24, 2019, 5 Pages.

Office Action Issued in Brazilian Patent Application No. PI0914960-0, dated Aug. 30, 2019, 6 Pages.

"Second Office Action Issued in Brazilian Patent Application No. PI0913024-1", dated Sep. 25, 2019, 4 Pages.

"Non Final Office Action Issued in U.S. Appl. No. 15/605,004", dated Jan. 24, 2020, 15 Pages.

"Examiner's Decision of Final Refusal Issued in Indian Patent Application No. 05584/CHENP/2010", dated Jan. 24, 2020, 5 Pages.

"Examiner's Decision of Final Refusal Issued in Indian Patent Application No. 01489/DELNP/2008", dated Jan. 30, 2020, 7 Pages.

"Non Final Office Action Issued In U.S. Appl. No. 16/289,093", dated May 1, 2020, 17 Pages.

"Non Final Office Action Issued in U.S. Appl. No. 16/825,044", dated Oct. 5, 2020, 21 Pages.

"Office Action Issued In Brazilian Patent Application No. PI0712171-7", dated Jul. 22, 2020, 5 Pages.

"Final Office Action Issued in U.S. Appl. No. 15/605,004", dated Jul. 27, 2020, 17 Pages.

"Notice of Allowance Issued in U.S. Appl. No. 16/825,044", dated Jan. 22, 2021, 9 Pages.

"Search Report Issued in European Patent Application No. 21159568.1", dated Jun. 2, 2021, 9 Pages.

* cited by examiner

COMMAND USER INTERFACE FOR DISPLAYING SELECTABLE SOFTWARE FUNCTIONALITY CONTROLS

RELATED APPLICATIONS

This application is a Continuation of U.S. application Ser. No. 14/981,404 entitled "Command User Interface for Displaying Selectable Software Functionality Controls", filed Dec. 28, 2015, which is a Continuation of U.S. application Ser. No. 13/595,084, now U.S. Pat. No. 9,223,477, entitled "Command User Interface for Displaying Selectable Software Functionality Controls", filed Aug. 27, 2012, which is a Continuation of U.S. application Ser. No. 10/955,967, now U.S. Pat. No. 8,255,828, entitled "Command User Interface for Displaying Selectable Software Functionality Controls", filed Sep. 30, 2004, which claims priority to U.S. Provisional Application No. 60/601,815 entitled "Improved User Interfaces for Computer Software Application", filed Aug. 16, 2004, which are incorporated herein by reference in their entireties. To the extent appropriate, a claim of priority is made to each of the above-recited applications.

FIELD OF THE INVENTION

The present invention generally relates to software application user interfaces. More particularly, the present invention relates to a command user interface for displaying selectable software functionality controls.

BACKGROUND OF THE INVENTION

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

To assist users to locate and utilize functionality of a given software application, a user interface containing a plurality of generic functionality controls is typically provided along an upper, lower or side edge of a displayed workspace in which the user may enter, copy, manipulate and format text or data. Such functionality controls often include selectable buttons with such names as "file," "edit," "view," "insert," "format," and the like. Typically, selection of one of these top-level functionality buttons, for example "format," causes a drop-down menu to be deployed to expose one or more selectable functionality controls associated with the top-level functionality, for example "font" under a top-level functionality of "format."

After a user selects a desired functionality control, or if the user moves the mouse cursor to a different location, the drop-down menu typically disappears. If the user determines that functionality of the first drop-down menu was the desired functionality, the user must remember which top-level functionality was selected, reselect that functionality and then find the desired functionality control all over again. Accordingly, in order to use the functionality of a given software application, the user must know the desired functionality is available under one of the selectable buttons, or the user must select different top-level functionalities until the desired specific functionality is located. Such a method of searching for desired functionality is cumbersome and time-consuming, particularly for less experienced users, and when new functionality is added by developers of the software application, the new functionality may never be utilized unless the user is somehow educated as to its existence.

Accordingly, there is a need in the art for an improved functionality command user interface for displaying selectable software functionality controls and for presenting logical groupings of particular functionality controls associated with a selected top-level functionality. It is with respect to these and other considerations that the present invention has been made.

SUMMARY OF THE INVENTION

Embodiments of the present invention solve the above and other problems by providing an improved user interface for displaying selectable software functionality controls and for presenting logical groupings of particular functionality controls associated with a selected top-level functionality. Generally, aspects of the present invention provide for organization of the functionality of a given software application into task-based modes. The modes are associated with tabs in a ribbon-shaped user interface, and the tabs are labeled with descriptive text associated with different functionality modes or tasks. Underneath a row of top-level functionality tabs, functionalities associated with a given top-level functionality tab are presented in logical groupings. Selection of a particular tab switches modes of the user interface to present controls for functionalities associated with the selected tab.

According to an aspect of the invention, methods and systems for providing functionality from a software application via an improved user interface are provided. A plurality of functionalities available from one or more software applications is organized according to one or more tasks that may be performed with the software application. A user interface tab for each of the one or more tasks is provided in the user interface. Upon receiving an indication of a selection of a given user interface tab, one or more selectable functionality controls are provided in the user interface for selecting one or more functionalities organized under a given task associated with the selected user interface tab.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

BRIEF DESCRIPTION OF THE DRAWINGS

FIG. 8 illustrates a computer screen display showing the presentation of a tool tip dialog box for providing helpful information about a selected or focused-on functionality control.

DETAILED DESCRIPTION

As briefly described above, embodiments of the present invention are directed to an improved user interface for displaying selectable software functionality controls associated with task-based functionality and for presenting logical groupings of particular functionality associated with a selected task-based functionality. As will be described in detail below, when one task-based functionality tab is selected from the user interface of the present invention, selectable functionality controls provided by the associated software application for performing aspects of a task related to the selected task-based functionality tab are presented in a ribbon-shaped user interface above a workspace in which the user is entering or editing a document or object. Upon selection of a different task-based functionality tab, the presentation of functionality controls associated with the first task is removed, and selectable functionality controls associated with the second selected task-based functionality tab are presented in the user interface. The selectable functionality controls presented in the user interface are grouped into logical groupings for more efficient utilization.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
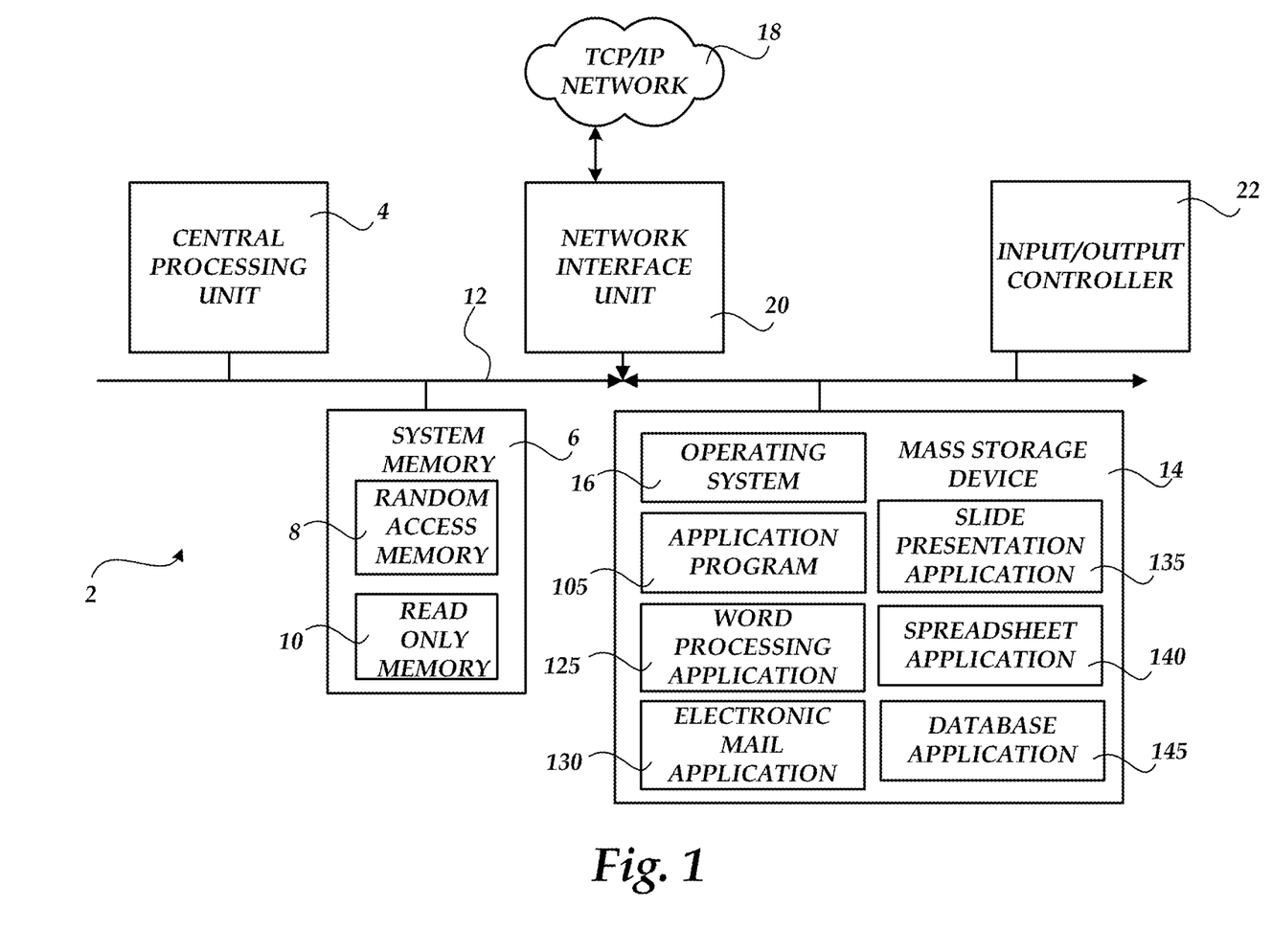
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from Microsoft Corporation of Redmond, Wash. The mass storage device 14 and RAM 8 may also store one or more application programs. In particular, the mass storage device 14 and RAM 8 may store an application program 105 for providing a variety of functionalities to a user. For instance, the application program 105 may comprise many types of programs such as a word processing application, a spreadsheet application, a desktop publishing application, and the like. According to an embodiment of the present invention, the application program 105 comprises a multiple functionality software application for providing word processing functionality, slide presentation functionality, spreadsheet functionality, database functionality and the like. Some of the individual program modules comprising the multiple functionality application 105 include a word processing application 125, a slide presentation application 135, a spreadsheet application 140 and a database application 145. An example of such a multiple functionality application 105 is OFFICE manufactured by Microsoft Corporation. Other software applications illustrated in FIG. 1 include an electronic mail application 130.

Figure 2:
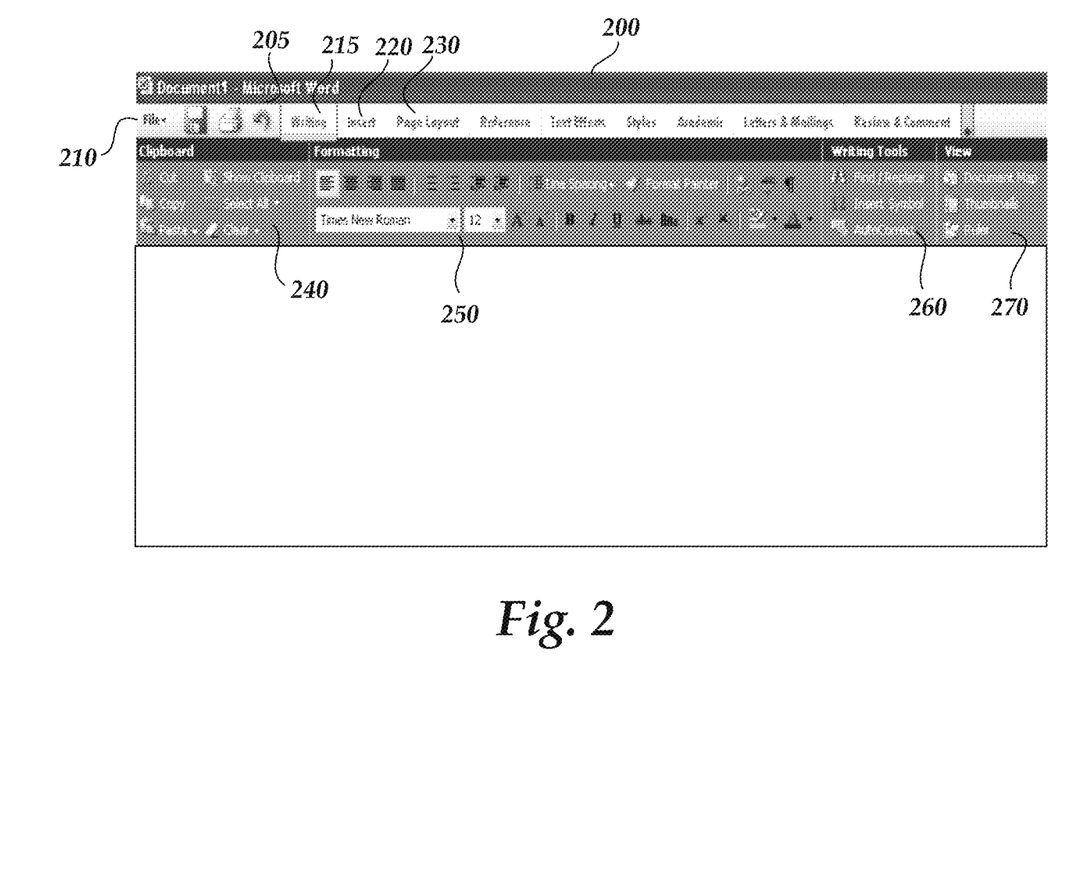
FIG. 2 is an illustration of a computer screen display showing a ribbon-shaped user interface for displaying task-based top-level functionality tabs and for displaying a plurality of functionalities available under a selected top-level functionality tab.

FIG. 2 is an illustration of a computer screen display showing a ribbon-shaped user interface for displaying task-based top-level functionality tabs and for displaying a plurality of functionalities available under a selected top-level functionality tab. As briefly described above, the improved user interface of the present invention includes a ribbon-shaped user interface for displaying selectable controls associated with task-based functionality available under a given software application, such as the software application 105 illustrated in FIG. 1. A first section 210 of the user interface 200 includes generic selectable controls for functionality not associated with a particular task, such as word processing versus spreadsheet data analysis. For example, the section 210 includes selectable controls for general file commands such as "file open," "file save" and "print." According to one embodiment of the present invention, the selectable controls included in the first section 210 are controls that may be utilized by a variety of software applications comprising a multiple functionality application 105. That is, the selectable controls included in the first section 210 may be controls that are generally found and used across a number of different software applications.

Selectable controls included in the first section 210 may be utilized for all such applications comprising such a multiple functionality application, but other selectable controls presented in the user interface 200 described below, may be tailored to particular tasks which may be performed by particular software applications comprising the multiple functionality application. On the other hand, it should be appreciated that the user interface 200 described herein may be utilized for a single software application such as a word processing application 125, a slide presentation application 135, a spreadsheet application 140, a database application 145, or any other software application which may utilize a user interface for allowing users to apply functionality of the associated application.

Referring still to FIG. 2, adjacent to the first section 210 of the user interface 200 is a task-based tab section. The tab section includes selectable tabs associated with task-based functionality provided by a given software application. For purposes of example, the task-based tabs illustrated in FIG. 2 are associated with tasks that may be performed using a word processing application 125. For example, a "Writing" tab 215 is associated with functionality that may be utilized for performing writing tasks. An "Insert" tab 220 is associated with functionality associated with performing insert operations or tasks. A "Page Layout" tab 230 is associated with functionality provided by the associated application for performing or editing page layout attributes of a given document.

As should be appreciated, many other task-based tabs or selectable controls may be added to the tab section of the user interface for calling functionality associated with other tasks. For example, task tabs may be added for text effects, document styles, review and comment, and the like. And, as described above, the user interface 200 may be utilized for a variety of different software applications. For example, if the user interface 200 is utilized for a slide presentation application, tabs contained in the tab section may include such tabs as "Create Slides," "Insert," "Format," "Drawing," "Effects," and the like associated with a variety of tasks that may be performed by a slide presentation application. Similarly, tabs that may be utilized in the tab section of the user interface 200 for a spreadsheet application 140 may include such tabs as "Data" or "Data Entry," "Lists," "Pivot Tables," "Analysis," "Formulas," "Pages and Printing," and the like associated with tasks that may be performed using a spreadsheet application.

Immediately beneath the generic controls section 210 and the task-based tab section is a selectable functionality control section for displaying selectable functionality controls associated with a selected tab 215, 220, 230 from the task-based tab section. According to embodiments of the present invention, when a particular tab, such as the "Writing" tab 215 is selected, selectable functionality available from the associated software application for performing the selected task, for example a writing task, is displayed in logical groupings. For example, referring to FIG. 2, a first logical grouping 240 is displayed under a heading "Clipboard." According to embodiments of the present invention, the clipboard section 240 includes selectable functionality controls logically grouped together and associated with clipboard actions underneath the general task of writing. For example, the clipboard section 240 may include such selectable controls as a cut control, a copy control, a paste control, a select all control, etc. Adjacent to the clipboard section 240, a second logical grouping 250 is presented under the heading "Formatting." Selectable controls presented in the "Formatting" section 250 may include such selectable controls as text justification, text type, font size, line spacing, boldface, italics, underline, etc. Accordingly, functionalities associated with formatting operations are logically grouped together underneath the overall task of "Writing." A third logical grouping 260 is presented under the heading "Writing Tools." The writing tools section 260 includes such writing tools as find/replace, autocorrect, etc.

Figure 3:
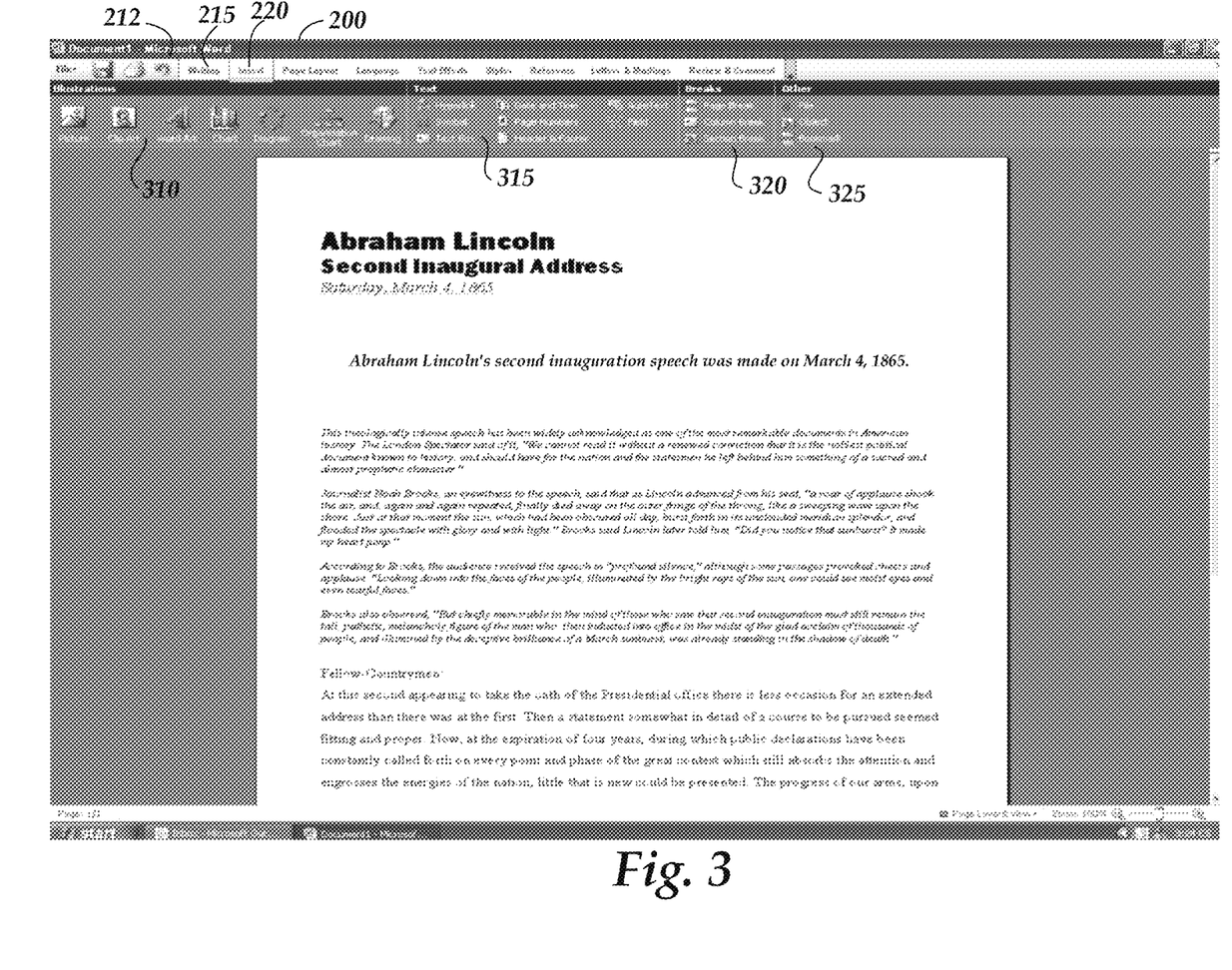
FIG. 3 illustrates a computer screen display showing the user interface illustrated in FIG. 2 whereby a different set of functionalities is presented associated with a different top-level functionality tab.

As described below with reference to FIGS. 3 and 4, upon selection of a different task-based tab from the tab section, a different set of selectable functionality controls in different logical groupings is presented in the user interface 200 associated with the selected task-based tab. As illustrated in FIG. 3, the "Insert" task tab 220 is selected, and the selectable functionality controls presented in the user interface 200 are changed from those illustrated in FIG. 2 to include selectable functionality controls associated with the insert task. For example, a first selectable functionality control section 310 is illustrated under a heading "Illustrations." The illustrations section 310 includes selectable controls for allowing a user to insert into the application workspace a variety of illustrations such as pictures, clip art, word art, charts, diagrams, organization charts, drawings and the like. A second selectable functionality control section 315 is provided under the heading "Text" and provides selectable functionality controls for inserting text-type objects or data into the user's workspace. For example, controls contained in the text section 315 include hyperlink, symbol, text box, date and time, page numbers, headers and footers, etc. A third selectable functionality control section 320 is presented under the heading "Breaks." This section includes selectable functionality controls for inserting breaks such as page breaks, column breaks, section breaks, etc.

Figure 4:
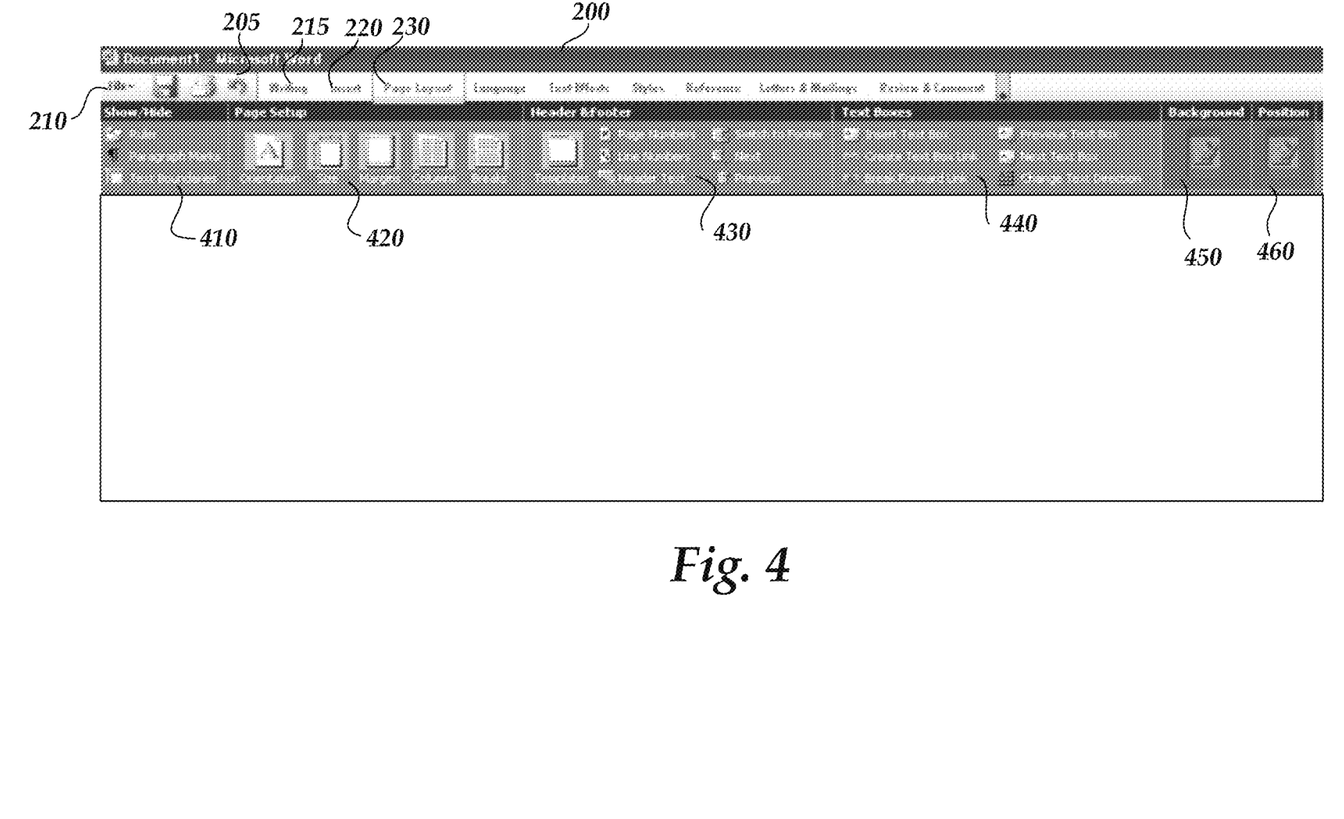
FIG. 4 illustrates a computer screen display showing the user interface illustrated in FIG. 2 whereby a different set of functionalities is presented associated with a different top-level functionality tab.

Referring to FIG. 4, the user interface 200 illustrated in FIGS. 2 and 3 is illustrated wherein the "Page Layout" tab 230 is selected. Upon selection of the "Page Layout" tab 230, selectable functionality controls associated with performing page layout tasks are presented to the user in logical groupings 410, 420, 430, 440, 450, 460. For example, a first logical grouping 410 is illustrated under the heading "Show/Hide" and includes selectable functionality controls associated with showing or hiding page layout information such as ruler information, paragraph markings, text boundaries, and the like. A second section 420 is grouped under a heading "Page Setup." The page setup section 420 includes selectable functionality controls for adjusting or editing a page's orientation, size, margins, column settings, page layout breaks, etc. A third section 430 is presented under a heading "Header & Footer." This section 430 includes selectable functionality controls for software application functionality related to inserting and editing header and footer information.

Along the right edge of the user interface 200 is included a "Background" section 450 and a "Position" section 460. According to the user interface illustrated in FIG. 4, these selectable functionality control sections are closed or collapsed. That is, the user interface 200, as illustrated in FIG. 4, has insufficient space for displaying individual selectable functionality controls under each of these two sections. Accordingly, these two sections are closed from view. As should be appreciated, depending upon the screen size available for displaying the user interface 200 or depending upon the display settings utilized by a given user of the user interface 200, varying amounts of space will be available for displaying the task-based tabs and associated selectable functionality controls. Accordingly, when insufficient space is available in the user interface 200 for displaying all logical groupings associated with a given task-based tab, a determination may be made at application run time as to any logical groupings that must be collapsed or closed until the associated task-based tab is selected. Similarly, if the user manually reduces the size of the user interface 200, a determination is made as to the available space for displaying selectable functionality control sections, and certain selectable functionality control sections are collapsed as required. As should be appreciated, a determination may be made as to the order of collapsing selectable functionality control sections such that a criteria, such as "most used" or "most recently used" may be used for determining which selectable functionality control sections are displayed and which sections are collapsed as the available space in the user interface is decreased.

According to an alternate embodiment, if the user interface 200 lacks sufficient space to display all logical groupings of functionality controls associated with a given task-based tab, the size of the display of individual logical groupings is reduced to allow space for the display of all associated logical groupings. According to one aspect of this embodiment, different sizes of groupings displays, for example small, medium and large, may be defined. At display time, a determination may be made as to the available space. At a starting point, the largest size for each applicable logical grouping display is presented. As required, the display size is reduced (i.e., large to medium to small) for each logical grouping until each grouping fits in the available space. In addition, for smaller logical grouping display layouts, text labels may be shortened or eliminated, and the layout of individual selectable controls contained in given groupings may be rearranged to allow for more efficient use of space.

According to embodiments of the present invention, selection of a closed or collapsed selectable functionality control section, such as the sections 450, 460 causes a rearrangement of the user interface 200 for presenting the selectable functionality controls associated with the selected section. That is, as should be appreciated, one or more of the other presently fully displayed sections may be collapsed in order to make room for the selectable functionality controls of a previously closed or collapsed section. Alternatively, all selectable functionality controls presently displayed in the user interface 200 may remain displayed as is, and selectable functionality controls contained under a selected closed or collapsed section may be displayed in a drop-down display that is presented vertically below the selected closed or collapsed section or that is displayed horizontally underneath the user interface 200. Alternatively, the selectable functionality controls associated with a selected closed or collapsed section may be displayed in a pop-up menu or text box.

According to embodiments of the present invention, customization of the displayed selectable functionality control sections may be performed. That is, the selectable functionality control sections under a given selected task tab may be reordered according to the particular needs of a given user, and certain sections may be hidden from view if the functionality associated with those sections are never used by a given user. Or, a presently displayed selectable functionality control section may be manually collapsed in order to make space in the user interface 200 for the display of a selectable functionality control section that is presently closed or collapsed due to insufficient space in the user interface 200.

According to embodiments of the present invention, a user may browse through available selectable functionality controls using a mouse-over action. During the mouse-over action, the displayed functionality is dynamically changed relative to a tab or functionality control on which the mouse cursor is focused at a given time. For example, referring to FIGS. 2, 3, 4, if a user clicks and holds the mouse cursor over the "Writing" tab, the selectable functionality controls sections and associated controls are displayed. If the user does not see desired functionality controls, the user may mouse-over to a second tab, for example, the "Insert" tab 220, and the selectable functionality controls groupings associated with the "Insert" tab are dynamically displayed as illustrated in FIG. 3. If the user sees a desired control in one of the selectable functionality controls sections or groupings under the "Insert" tab, for example, the user may select the desired control for application to a selected document or object. After the user selects the desired control or command, the user interface 200 reverts back to the display that was presented to the user before the user started the mouse-over action. That is, a display of the selectable functionality control sections of the finally selected control does not remain displayed in the user interface 200. The user interface 200 returns to the original display prior to the mouse-over action.

Figure 5:
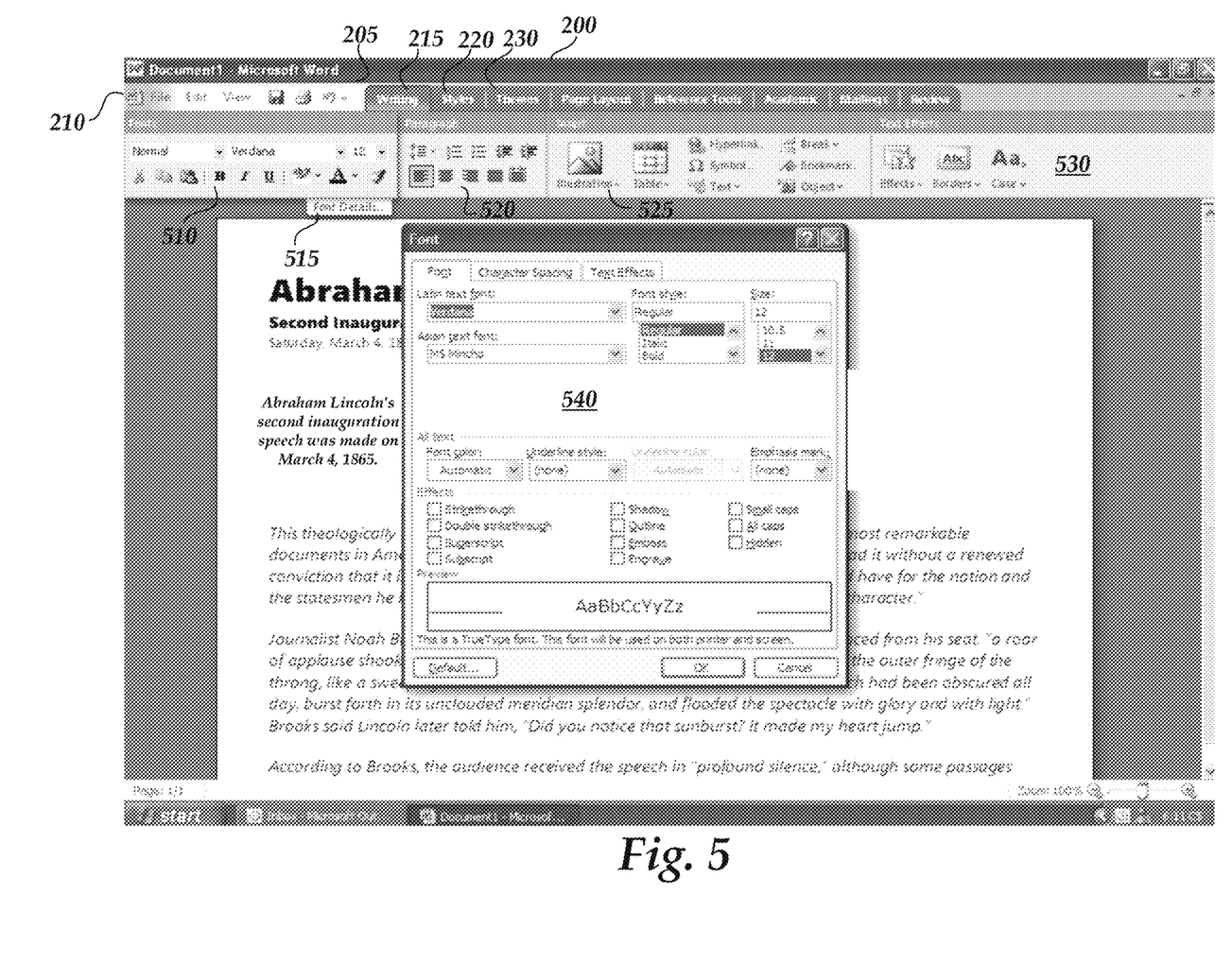
FIG. 5 illustrates a computer screen display showing a pop-up user interface for providing detailed functionality associated with a selected subset of functionalities presented in the ribbon-shaped user interface illustrated in FIGS. 2 through 4.

As should be appreciated by those skilled in the art, because of space limitations in the sections of the user interface 200 containing logical groupings of selectable functionality controls, not all functionality that may be desired or utilized by a given user of the software application may be accessible by selecting one of the controls presented in a given section. Many additional functionalities may be available that may be associated with, or otherwise related to a given selectable functionality control section under a selected task-based tab. Referring now to FIG. 5, if a user requires the use of additional functionality not presented in a given selectable functionality control section, or if the user desires detailed information regarding the attributes of a document or object according to the application of functionality presented in a given selectable functionality control section, a dialog 540 may be launched to provide additional selectable functionality controls, or to provide detailed information regarding the application of functionality to a document or object.

For example, as illustrated in FIG. 5, selection of the "Fonts" selectable functionality control section 510 causes the deployment of a "Font Details" tab 515 below the section 510. Selection of the "Font Details" tab 515 causes deployment of the "Font" dialog 540 to provide the user detailed information as to the application of particular functionality, for example fonts, to a selected document or object and provides the user additional selectable functionality not presented to the user in the selectable functionality control section 510. As should be appreciated, the "Font Details" tab 515 may be deployed each time the user focuses a mouse cursor in any portion of the section 510 to alert the user that the user may selectively launch the dialogue 540 if desired. Alternatively, other mechanisms may be used for deploying the tab 515 such as selecting the section heading, for example "Fonts" for the section 510, or selecting any area within the section 510 not associated with a particular control, or right clicking the "Fonts" section 510.

Figure 6:
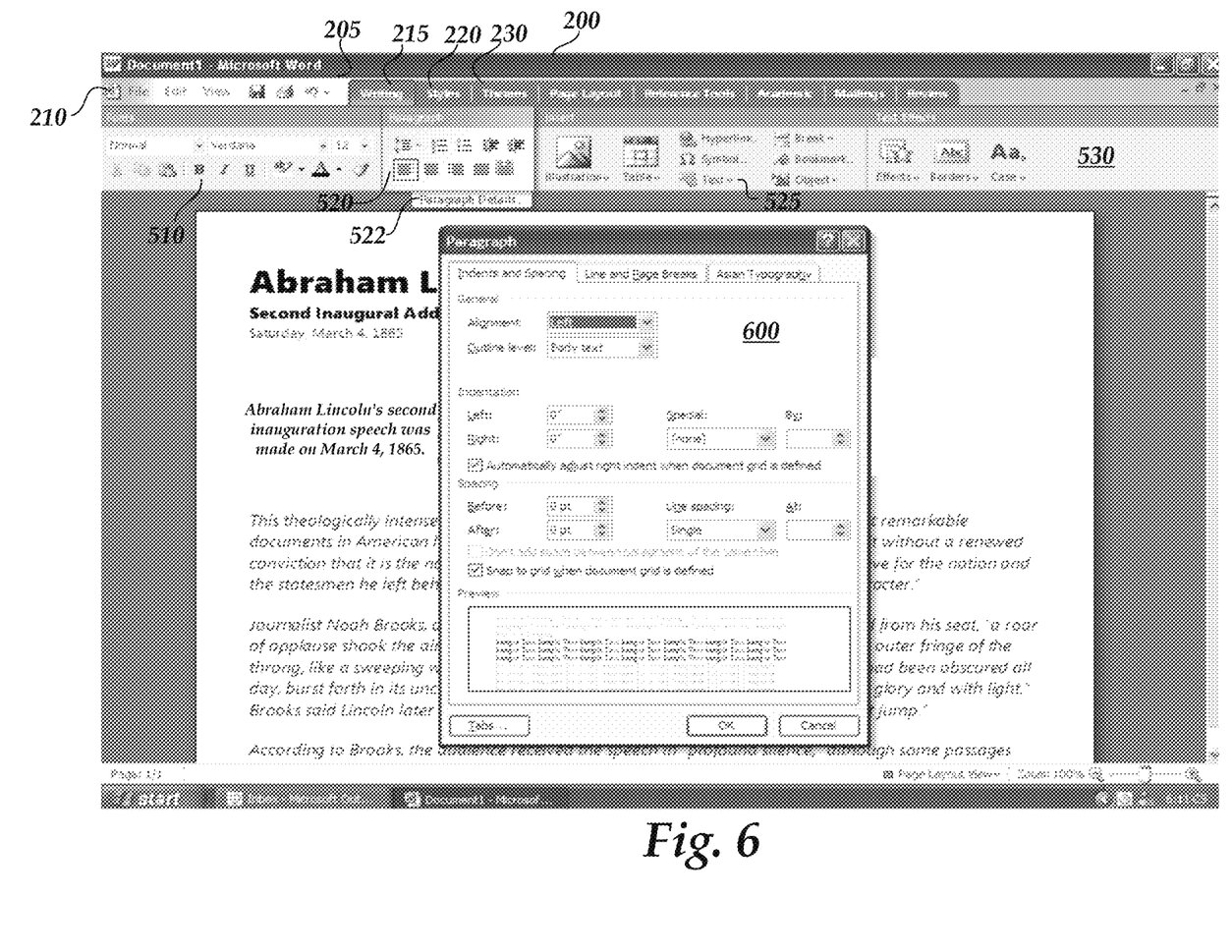
FIG. 6 illustrates a computer screen display showing a pop-up user interface for providing detailed functionality associated with a selected subset of functionalities presented in the ribbon-shaped user interface illustrated in FIGS. 2 through 4.

Referring to FIG. 6, a second launched dialog 600 is illustrated which is associated with a second selectable functionality control section 520 of the user interface 200. As described with respect to FIG. 5, a tab 522 is deployed underneath the selectable functionality control section 520 for launching the dialog 600 for providing a user additional functionality or additional information regarding attributes applied to a selected document or object under the associated selectable functionality control section 520, for example the "Paragraph" section. As should be appreciated, dialog such as the dialogs 540 and 600 illustrated in FIGS. 5 and 6, may be launched for any selectable functionality control section displayed in the user interface 200 where additional functionality or details may be provided to a desiring user.

Figure 7:
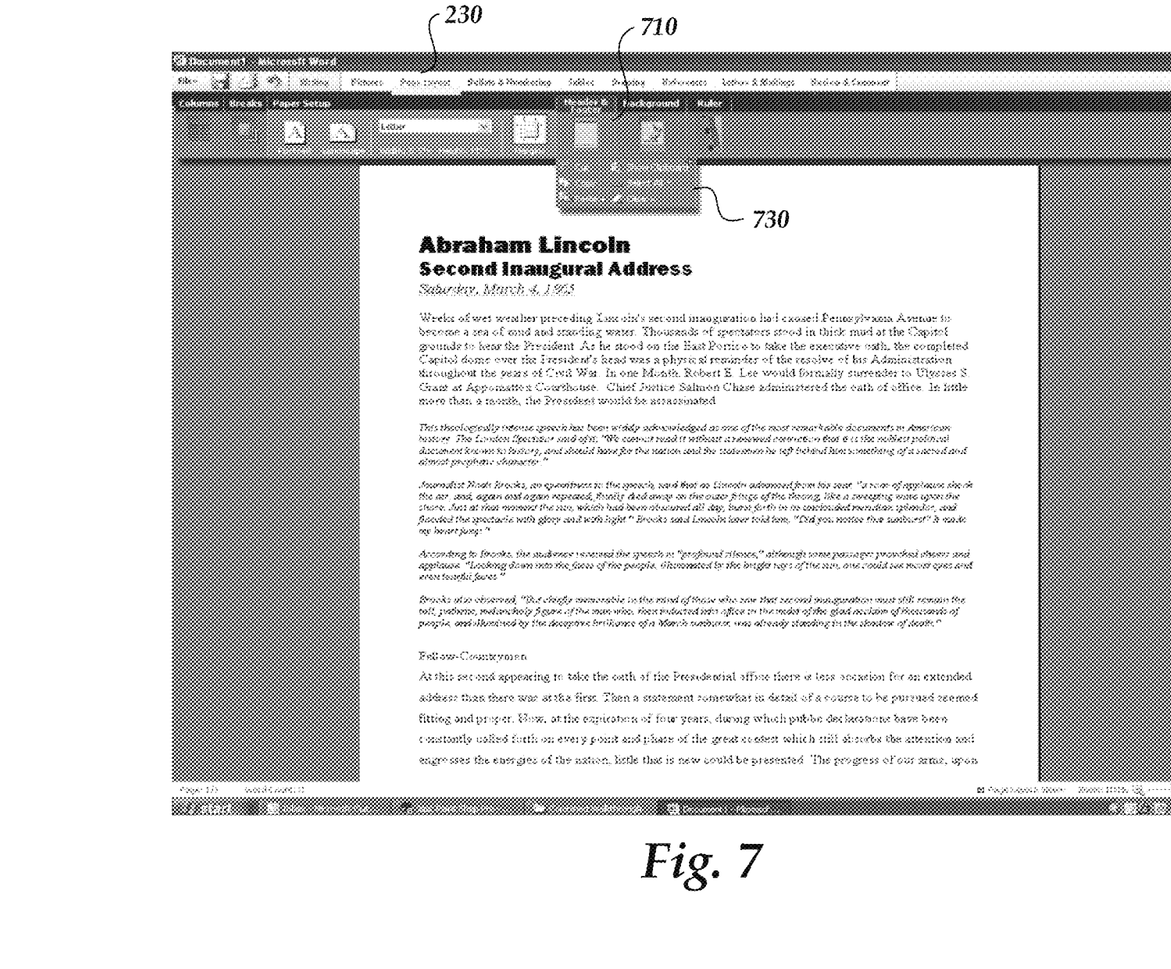
FIG. 7 illustrates a computer screen display showing a drop-down menu of functionalities associated with a selected functionality presented in the ribbon-shaped user interface illustrated in FIGS. 2 through 4.

Referring now to FIG. 7, a drop-down menu of selectable functionality controls is illustrated beneath a selected control 710 in the main body of the user interface 200. In some cases, insufficient space may be available for all selectable functionality controls to be displayed into a logical grouping in the user interface 200 upon selection of an associated functionality tab 230. According to embodiments of the invention, in such a case, a control such as the "Header & Footer" control 710 may be populated into the user interface 200. Selection of the control 710 causes deployment of the drop-down menu 730 for displaying selectable functionality controls associated with the control 710.

Referring now to FIG. 8, a variety of tool tips may be displayed to the user to provide helpful information or tutorials regarding different functionality of an associated application. For example, as illustrated in FIG. 8, a tool tips pop-up dialog 820 is displayed for providing helpful information regarding the functionality available under a "Columns" section 810. As shown in the pop-up dialog 820, helpful information is provided regarding application of columns formatting and structure to a document. In addition, online training and other helpful information may be provided through the deployed pop-up dialog. As should be understood, helpful tool tips, such as the tool tip 820, may be provided for any functionality grouping displayed in the user interface 200, or tool tips 820 may be provided for individual functionality controls. Deployment of tool tips 820 may be performed in response to a variety of different user actions. For example, placing a mouse cursor on a selected control or grouping of controls followed by selection of a function key, such as the F1 key may deploy the pop-up dialog. For another example, a right-click of a mouse device on a given grouping of functionality controls may deploy the pop-up dialog. Other mechanisms including mouse-over actions or automatic deployment after a set amount of time of focusing a mouse cursor in a given section of the user interface 200 may be utilized for deploying the tool tips pop-up dialog.

As described herein, an improved user interface is provided for exposing task-based top-level functionality tabs for displaying logical groupings of selectable software functionality controls associated with given task-based functionality tabs. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A device-implemented method for providing a user interface, the method comprising:
    generating for display a first task-based tab section that includes a first plurality of selectable tabs associated with task-based functionality of a first software application;
    determining to collapse a first selectable functionality control section or a second selectable functionality control section; and
    in response to collapsing the second selectable functionality control section, generating, for display concurrently with the first task-based tab section, the first selectable functionality control section and the second selectable functionality control section, wherein:
        a first plurality of selectable controls associated with a first tab of the first plurality of selectable tabs and included in the first selectable functionality control section are displayed while a second plurality of selectable controls associated with a second tab of the first plurality of selectable tabs and included in the second selectable functionality control section are suppressed for display,
        the second selectable functionality control section, when selected, expands in a horizontal direction to display the second plurality of selectable controls, and
        the first selectable functionality control section and the second selectable functionality control section persist during an edit of an electronic document.

2. The method of claim 1, further comprising:
generating for display a second task-based tab section that includes a second plurality of selectable tabs associated with task-based functionality of a second software application, wherein at least one selectable tab of the second plurality of selectable tabs is different from the first plurality of selectable tabs; and
generating for display a third selectable functionality control section that includes a third plurality of selectable controls associated with a third tab of the second plurality of selectable tabs.

3. The method of claim 2, wherein the first software application is a word processing application and the second software application is one of a spreadsheet application, a slide presentation application, a database application, a desktop publishing application, or an electronic mail application.

4. The method of claim 1, further comprising:
receiving a selection of the second tab from the first plurality of selectable tabs; and
in response to receiving the selection, generating, for display in the first selectable functionality control section, the second plurality of selectable controls associated with the selected second tab.

5. The method of claim 4, further comprising organizing one or more selectable controls in the second plurality of selectable controls into one or more logical groupings.

6. The method of claim 5, further comprising:
receiving a selection of a logical grouping in the one or more logical groupings; and
in response to the selection of the logical grouping, generating for display a dialog that provides additional selectable controls relating to a selected logical grouping.

7. The method of claim 5, further comprising:
determining a screen size for the first software application; and
based on the determined screen size, collapsing at least one logic grouping of the one or more logical groupings.

8. The method of claim 1, further comprising generating, for display concurrently with and adjacent to the first task-based tab section, a generic selectable control section.

9. The method of claim 1, further comprising organizing one or more selectable controls in the first plurality of selectable controls into one or more logical groupings.

10. The method of claim 1, further comprising generating for display at least a portion of the electronic document, wherein the portion of the electronic document is not obscured by the first selectable functionality control section.

11. A system for generating a user interface, the system comprising:
at least one processor; and
a memory storing instructions that, when executed by the at least one processor, perform operations of:
generating, for display, a first task-based tab section that includes a first plurality of selectable tabs associated with task-based functionality of a first software application;
determining to collapse a first selectable functionality control section or a second selectable functionality control section; and
in response to collapsing the second selectable functionality control section, generating, for display concurrently with the first task-based tab section, the first selectable functionality control section and the second selectable functionality control section, wherein:
a first plurality of selectable controls associated with a first tab of the first plurality of selectable tabs and included in the first selectable functionality control section are displayed while a second plurality of selectable controls associated with a second tab of the first plurality of selectable tabs and included in the second selectable functionality control section are suppressed for display,
the second selectable functionality control section, when selected, expands in a horizontal direction to display the second plurality of selectable controls, and
the first selectable functionality control section and the second selectable functionality control section persist during an edit of an electronic document.

12. The system of claim 11, wherein the memory stores instructions that, when executed by the at least one processor, further perform the operations of:
generating, for display, a second task-based tab section that includes a second plurality of selectable tabs associated with task-based functionality of a second software application, wherein a selectable tab of the second plurality of selectable tabs is different from the first plurality of selectable tabs; and
generating, for display, a third selectable functionality control section that includes a third plurality of selectable controls associated with a third tab of the second plurality of selectable tabs.

13. The system of claim 12, wherein the first software application is a word processing application and the second software application is one of a spreadsheet application, a slide presentation application, a database application, a desktop publishing application, or an electronic mail application.

14. The system of claim 13, wherein:
the first plurality of selectable tabs include at least an insert tab and a page layout tab; and
the second plurality of selectable tabs include at least one of a create slides tab, an insert tab, a format tab, a drawing tab, a data tab, a lists tab, a pivot tables tab, an analysis tab, or a formulas tab.

* * * * *